(12) United States Patent    (10) Patent No.:   US 12,639,936 B2
    Walter                                (45) Date of Patent:       May 26, 2026

(54) SURVEILLANCE SYSTEM HAVING A PERSON DETECTOR

(71) Applicant: Siemens Aktiengesellschaft, Munich (DE)

(72) Inventor: Maximilian Walter, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/993,050

(22) PCT Filed: May 12, 2023

(86) PCT No.: PCT/EP2023/062712
    § 371 (c)(1),
    (2) Date: Jan. 10, 2025

(87) PCT Pub. No.: WO2024/012746
    PCT Pub. Date: Jan. 18, 2024

(65) Prior Publication Data
    US 2026/0024321 A1     Jan. 22, 2026

(30) Foreign Application Priority Data
    Jul. 13, 2022    (EP) ..................................... 22184577

(51) Int. Cl.
    *G06V 10/776*        (2022.01)
    *G06V 10/82*         (2022.01)
             (Continued)

(52) U.S. Cl.
    CPC ............ *G06V 10/776* (2022.01); *G06V 10/82* (2022.01); *G06V 20/52* (2022.01); *G06V 40/10* (2022.01);
             (Continued)

(58) Field of Classification Search
    None
    See application file for complete search history.

(56) References Cited

U.S. PATENT DOCUMENTS

| | | | |
|---|---|---|---|
| 11,436,827 B1* | 9/2022 | Ho ........................ | G06F 16/787 |
| 2009/0015663 A1 | 1/2009 | Doettling et al. | |

(Continued)

FOREIGN PATENT DOCUMENTS

| | | |
|---|---|---|
| DE | 102019124301 | 3/2020 |
| DE | 102020133784 B3 | 1/2022 |

(Continued)

OTHER PUBLICATIONS

Arbeitsraumüberwachung und autonome Bahnplanung für ein sicheres und flexibles Roboter-Assistenzsystem in der Fertigigung, FAU Studien aus dem Maschinenbau 312, Technische Fakultät der Friedrich-Alexander-Universität Erlangen-Nürnberg, Dissertation von Christina Ramer, 238 Seiten; 2018.

(Continued)

*Primary Examiner* — Daniel T Tekle
(74) *Attorney, Agent, or Firm* — Cozen O'Connor

(57) ABSTRACT

A surveillance system having a person detector includes an imaging sensor for recording digital image files or point clouds and includes an evaluation unit that is configured to evaluate the image files or the point clouds and to output position information of a person detected in a surveillance region, wherein a diagnostics unit has a first input channel for receiving the position information, a first output for checked position information of the detected person, and has a second output for an error signal, where the diagnostics unit is provide with a checking unit for checking the output of the position information of the detected person for plausibility with a plurality of plausibility criteria and is further configured to detect an error and output the error (Continued)

signal at the second output, if at least one plausibility criterion is violated.

10 Claims, 7 Drawing Sheets

(51) Int. Cl.

| | |
|---|---|
| *G06V 20/52* | (2022.01) |
| *G06V 40/10* | (2022.01) |
| *H04N 7/18* | (2006.01) |
| *H04N 17/00* | (2006.01) |
| *H04N 23/66* | (2023.01) |

(52) U.S. Cl.
CPC .......... *H04N 7/181* (2013.01); *H04N 17/002* (2013.01); *H04N 23/66* (2023.01)

(56) References Cited

U.S. PATENT DOCUMENTS

| | | | |
|---|---|---|---|
| 2015/0049911 | A1 | 2/2015 | Doettling et al. |
| 2017/0251182 | A1* | 8/2017 | Siminoff ................... G06T 7/70 |

| | | | |
|---|---|---|---|
| 2019/0156121 | A1* | 5/2019 | Kucharski .............. G06V 20/20 |
| 2019/0391294 | A1 | 12/2019 | Braune et al. |
| 2020/0082649 | A1 | 3/2020 | Lee |
| 2020/0290205 | A1 | 9/2020 | Hammes et al. |
| 2021/0357654 | A1* | 11/2021 | Adam .................... G06V 20/52 |
| 2022/0187444 | A1 | 6/2022 | Waibel |
| 2023/0281993 | A1* | 9/2023 | Stewart ................. G06V 20/52 |
| | | | 382/103 |

FOREIGN PATENT DOCUMENTS

| | | |
|---|---|---|
| EP | 1964063 B1 | 3/2018 |
| EP | 2825812 B1 | 9/2018 |
| EP | 3588365 | 1/2020 |
| EP | 3709106 | 9/2020 |

OTHER PUBLICATIONS

PCT International Search Report and Written Opinion of International Searching Authority mailed Jul. 18, 2023 corresponding to PCT International Application No. PCT/EP2023/062712 filed May 12, 2023.

* cited by examiner

SURVEILLANCE SYSTEM HAVING A PERSON DETECTOR

CROSS-REFERENCE TO RELATED APPLICATIONS

This is a U.S. national stage of application No. PCT/EP2023/062712 filed 12 May 2023. Priority is claimed on European Application No. 22184577.9 filed 13 Jul. 2022, the content of which is incorporated herein by reference in its entirety.

BACKGROUND OF THE INVENTION

1. Field of the Invention

The invention relates to a monitoring system having a person detector, which includes an imaging sensor, preferably having a camera for recording digital image files or a laser sensor system or having a time of flight (TOF) camera for recording point clouds, and including an evaluation unit that is configured to evaluate image files or point clouds and to output a position indication of a person that is recognized in a monitored area.

2. Description of the Related Art

Various methods and devices for recognizing and locating persons are generally known, inter alia using cameras whose video stream is analyzed image by image by an artificial neural network. The neural network can provide positions and an extension (length, height) of the persons that are recognized in a 2D image. From this position, an actual position of the person can then be determined.

A use of, for example, industrial robots without a separating protective device in the vicinity of the human, requires a suitable sensor-based environment detection to reliably detect persons and other objects and thus to react in an adapted manner in the event of an impending collision.

In Christina Ramer's dissertation "Workspace monitoring and autonomous path planning for a safer and more flexible robot assistance system in manufacturing", various methods for recognizing persons with the evaluation of camera images using neural networks are described.

EP 3 709 106 A1 discloses a safety system and method for securing a machine having a first sensor and a second sensor.

DE 10 2020 133 784 B4 discloses a method having a safety system and a safety system for locating at least one object, having at least one control and evaluation unit and a radio locating system.

EP 2 825 812 B1 describes an apparatus for securing a hazardous working area of an automatically operating machine, having at least one sensor unit, which each supply a current 3D image of the working area at defined time intervals, and monitors a defined protected area.

In EP 3 588 365 A1, a reliable multi-channel evaluation is improved because, for a check of the integrity of the processing channels, it is not necessary to compare the entire data of the processing results, but rather a few characteristic values that represent the information are sufficient.

EP 1 964 063 B1 discloses a method for configuring a monitoring device for monitoring a spatial area, in particular for fail-safe monitoring of the working area of an automatically operating machine or system.

In the context of the invention, fail-safe automation systems are understood as an industrial controller that is certified according to the International Electrotechnical Commission (IEC) 62061 standard and is thus configured as a controller that for providing functional safety.

Fail-safe automation systems control processes that can immediately assume a safe state as a result of unexpected operating behavior or a failure. These are fail-safe control processes in which an immediate shutdown to a safe state does not pose a risk to people or the environment. Fail-safe systems go beyond traditional safety engineering and activate far-reaching intelligent systems that reach as far as the electric drives and measuring systems. The user uses fail-safe systems in applications with increased safety requirements. Owing to improved error recognition and localization in fail-safe systems via detailed diagnostic information, production can be resumed quickly after a safety-related interruption.

Conventional person detectors art already achieve a very high quality, today. However, requirements that arise from the context of "functional safety" are not met. These requirements include a reliable diagnosis that uncovers all conceivable errors in a monitoring system and its subsystems, such as cameras, laser scanners, artificial neural networks, and/or communication links.

SUMMARY OF THE INVENTION

In view of the foregoing, it is therefore an object of the invention to provide a monitoring system that makes it possible to reliably recognize the occurrence of errors in, for example, camera-based person detectors.

This and other objects and advantages are in accordance with the invention by a monitoring system in which a diagnostic unit includes a first input channel in order to receive a position indication and includes a first output for a checked position indication (P), for example, a confirmation signal of the position indication, of the person that is recognized. The diagnostic unit has a second output for an error signal, and the diagnostic unit includes a checking unit so as to check the output of the position indication of the recognized person for plausibility using a plurality of plausibility criteria, where the diagnostic unit is further configured to recognize an error and to output the error signal at the second output in the event that at least one plausibility criterion is violated.

In order to reliably recognize the occurrence of errors in a camera-based person detector, a third component, i.e., the diagnostic unit, is inserted in addition to the first component of the person detector, i.e., the camera, and the second component, i.e., the evaluation unit, preferably formed as an artificial neural network. The diagnostic unit is configured to check the outputs of the artificial neural network (evaluation unit) for plausibility. This diagnostic unit is preferably realized in safer technology, for example, with a programmable logic F-controller that is configured for error safety, so that it can be assumed that all errors of the diagnostic unit itself are also controlled.

The following plausibility checks, for example, can be performed on the diagnostic unit:
- a) recognizing persons that appear or disappear in the center of an image,
- b) sudden changes in position,
- c) speeds of persons, which are greater than 2 m/s,
- d) persons in areas with access restrictions (for example, behind a fence),
- e) persons in positions that are physically impossible (for example, suspended in the air).

These checks take advantage of the fact that the artificial neural network operates in a stateless manner and is analyzed separately image by image. Therefore, errors in the artificial neural network or in the camera can, in many cases, be recognized by the supplied result becoming inconsistent in the sequence.

If at least one of the plausibility checks fails, then the diagnostic unit has recognized an error. The diagnostic unit can then decide to first tolerate this error (for example, if a person is missing in exactly one image, but is detected again in the same places immediately afterwards), or to signal a dangerous failure of recognition to the downstream decision-making.

In a further embodiment, the recognition of errors is improved by a diagnostic unit that is further configured to receive and evaluate additional information and to include the additional information in the plausibility check.

In accordance with the disclosed embodiments of the invention, the monitoring system includes an assignment unit, which is configured in a combination of a first person detector and the second person detector to receive a control signal from the diagnostic unit, where the first person detector includes a first imaging sensor, preferably a first camera for recording digital image files or a first laser sensor system for recording point clouds, and a first evaluation unit, the second person detector is designed having a second imaging sensor, preferably a second camera for recording digital image files or a second laser sensor system for recording point clouds, and is designed having a second evaluation unit, the diagnostic unit in this case is configured to generate the control signal such that an assignment of the first imaging sensor, preferably the first camera or the first laser sensor system, to the first evaluation unit or the second evaluation unit, or an assignment of the second imaging sensor, preferably the second camera or the second laser sensor system, to the first evaluation unit or the second evaluation unit is specified by the control signal.

The diagnostic unit is further configured so as, after a change of the assignment with an expectation, to use this specification to generate a fourth item of additional information because the diagnostic unit is configured such that after each change of the assignment an expectation from the recognized position indication from the preceding assignment is compared with the recognized position indication from the already existing assignment, where if the expectation does not match, then the error signal is output.

For example, the diagnostic unit can use additional information about the number of persons that are located in the area to be monitored to possibly recognize an error with a plausibility check. For example, the persons at the entrance can be counted by a turnstile. The diagnostic unit thus has an expectation that is used as an additional diagnosis. For example, if two persons are located in the area to be monitored, then the person detector must always report exactly two persons, otherwise a dangerous failure of the function of the person detector can be signaled. For larger areas to be monitored (for example, an entire factory hall or a view of areas that are covered by larger objects), multiple person detectors must be connected together, which cover the entire area. A common diagnostic unit can then be used for all person detectors. Here, this compares the number of persons that are recognized in total with the known number of persons. Accordingly, the diagnostic unit is configured to evaluate, as first additional information, a number of the persons that are located in the monitored area being monitored.

The monitoring system provides a further person detector, where the diagnostic unit is configured to use a cross comparison between a first channel from a first person detector and a second channel from a second person detector as a second item of additional information for the position data, where the channels are configured so as to be diverse with respect to one another.

With this technical solution, random hardware errors in individual components (for example, cameras, or AI hardware) can be recognized by using multiple recognition channels and a cross comparison in the diagnostic unit. The cross comparison checks whether the associated channels deliver the same number of persons in the same positions. Otherwise, the failure of a person detector is signaled.

Advantageously, the individual channels have the highest possible degree of diversity. For example,
a) The cameras of the individual channels view the scene from different angles, such as from the side (wall mounting) and from above (ceiling mounting).
b) Cameras and artificial neural network hardware from different manufacturers would be used.
c) The models running on the artificial neural networks were trained and tested with different training data.
d) The models for object recognition running on the artificial neural networks are different (for example, YOLO, versus FairMOT).
e) Different measuring principles are used, for example, RGB camera versus infrared camera, event camera versus frame camera, or camera versus radar.

Due to the diversity, not only random hardware errors, but also systematic errors can be recognized.

It is possible to achieve a yet further degree of safety by virtue of the fact that the diagnostic unit is configured to generate a phantom image. Here, the person detector has an image mixing unit that is configured to overlay the phantom image into the image files, as a result of which a current camera image is superimposed by the phantom image and a third item of additional information can thus be evaluated.

For each individual channel, the correct functioning of the evaluation unit (artificial intelligence, artificial neural networks (ANN) hardware) and the model configured there can be checked by feeding "phantoms" during operation. A phantom can preferably be generated on the diagnostic unit and initially consists of a position and, if necessary, further criteria, such as the type of person (for example, male, female, diverse), clothing (laboratory coat, overalls), carried equipment (for example, protective helmet, hand cart), and the activity performed (for example, walking, standing, kneeling). This information is sent by the diagnostic unit to a phantom image generator, which generates a photorealistic image (2D graphic) from it. This image, i.e., the phantom image, is overlaid on the actual camera image of a channel with the aid of an image mixing unit, i.e., the camera image is partially superimposed by the phantom image. The artificial neural network that is associated with the channel should correctly recognize this phantom, which can now be reliably checked by the monitoring unit or the diagnostic unit as additional information. If the phantom or the phantom image is not recognized, then a failure of the person detector can again be signaled.

Advantageously, the position of the phantom in the phantom image and additional criteria change regularly (for example, a different phantom could be used for each image or the phantom changes after a fixed time interval, for example, every 5 seconds). This ensures that different aspects of the recognition of the person detector are regularly checked (for example, at least once every hour, it is checked whether the person detector recognizes a male person in overalls who wears a helmet and performs work on the ground).

In a further advantageous embodiment, it would also be possible to randomly combine the various criteria with one another during the run time. This is useful in particular if the number of possible combinations is so large that a systematic generation of all combinations is no longer possible.

In a further advantageous embodiment, the different criteria are combined during the run time such at least all possible pairs of two criteria (for example, person type and clothing or clothing and carried equipment) occur at least once per unit of time. The remaining criteria are then again selected at random.

It would also be possible for the diagnostic unit or the phantom image generator to generate only phantoms at positions in which there are no real people to influence the recognition quality of the real people as little as possible.

The assignment unit could, for example, use a round robin method, in which case possible errors that exist between the cameras and the artificial neural networks can be uncovered. The round robin method is that the assignment between the camera and the artificial neural network is not statically defined, but changes regularly at the request of the diagnostic unit. For example, for each image or after a determined time interval. With each change, the diagnostic unit has a fixed expectation from the last cycle, which was determined on the respective other artificial neural network. If the expectation does not match the output of the person detector, then a failure can be signaled.

It is possible to uncover further errors due to checking the round robin method by the diagnostic unit. The diagnostic unit is again realized in safe F technology in accordance with IEC standard 61508. As a result, it can therefore not happen that the round robin method freezes due to an error and is no longer effective.

A further degree of safety is achieved if the imaging sensor, preferably the camera or the laser sensor system, includes an actuator in the system, and the diagnostic unit is configured to control the actuator via control commands such that a section, preferably a camera section or a laser scanning area of the monitored area, changes by a predetermined range, where this change can be evaluated as a fifth item of additional information in the diagnostic unit.

With the actuator, a camera section can then be changed regularly. The motor could also change, for example, the focal length, the viewing direction or the position of the camera. The change should be small, so that the camera always has the area to be monitored in the image area in all cases. For example, if a person is in the same place, then the person detector must always deliver a slightly different position depending on the current camera section. This can be evaluated as the fifth item of additional information. In this manner, errors, for example, in which the camera image is frozen, can be reliably recognized.

The diagnostic unit is responsible for controlling the current monitoring area or image area. The diagnostic unit selects a viewing angle, sends the corresponding signals to the actuator, and can correct the positions supplied by the person detector accordingly.

In order to check the timeliness of the monitoring system, the monitoring system includes a display device in the monitored area, where the display device is arranged such that the imaging sensor, preferably the camera or the laser sensor system, detects a display of the display device. The diagnostic unit is furthermore configured to output a symbol sequence as a notification on the display device, where the evaluation unit is configured to recognize this symbol sequence and to communicate this as a sixth item of additional information to the diagnostic unit.

The diagnostic unit can, for example, cause a symbol sequence (for example, three-digit numbers) to be displayed, this is displayed on the display device and can be detected by the camera, and this symbol sequence must be recognized in the evaluation unit by the artificial neural network. In this manner, the diagnostic unit can check whether the person detector actually works with the real image data.

In a further advantageous embodiment, the diagnostic unit prompts a regular change in the displayed symbol sequence. This makes it possible to check whether the person detector is working with current image information. In addition, the reaction time of the person detector can be continuously checked in this manner at runtime.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows multiple exemplary embodiments and embodiments of the invention, in which.

DETAILED DESCRIPTION OF THE EXEMPLARY EMBODIMENTS

Figure 1:
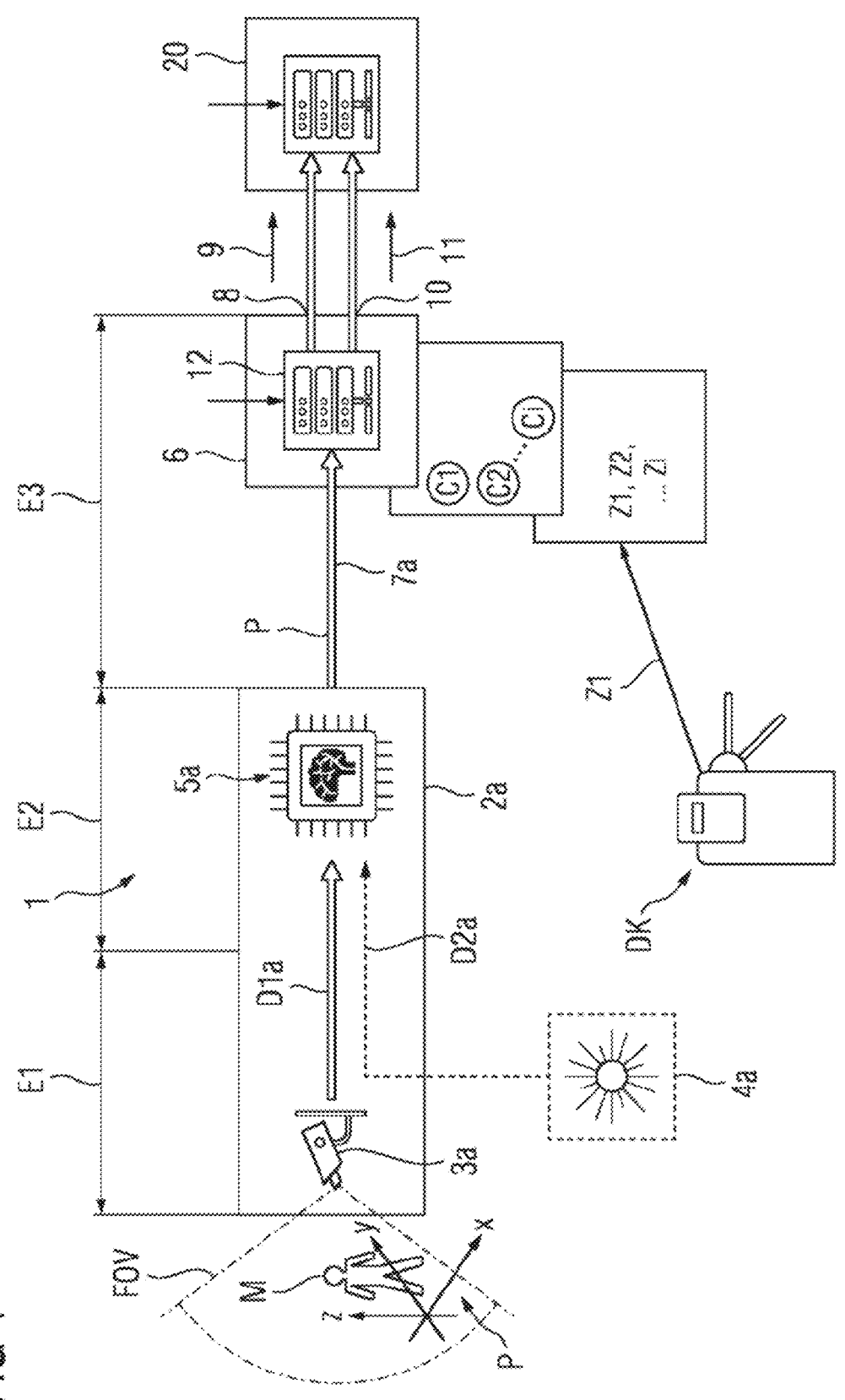
FIG. 1 shows a monitoring system having the fundamental three components in accordance with the invention.

As shown in FIG. 1, a monitoring system 1 is divided into three fundamental components. A first component E1 forms a first camera 3a, a second component E2 forms a first evaluation unit 5a and a third component E3 forms a diagnostic unit 6. The monitoring system 1 thus includes a first person detector 2a. The person detector 2a has the first camera 3a for recording digital image files D1a. Optionally, the person detector 2a can also have a laser sensor system 4a for recording point clouds D2a. The first evaluation unit 5a is configured to evaluate the image files D1a or the point clouds D2a and to output a position indication P of a person M that is recognized in a monitored area FOV.

The monitoring system 1 comprising the first component E1 and the second component E2 is known in accordance with the prior art. In accordance with the invention, the third component E3 is now added to the monitoring system 1 as a diagnostic unit 6. The diagnostic unit 6 checks the outputs of the evaluation unit 5a for plausibility. The evaluation unit 5a is designed as an artificial neural network ANN, and this advantageously operates in a stateless manner, which is used for the later plausibility checks. In order to receive the data, the diagnostic unit 6 has a first input channel 7a. The position indication P is received via the input channel 7a. At a first output 8, the diagnostic unit 6 can output a confirmation signal 9 of the position indication P of the recognized person M. At a second output 10 for an error signal 11, the diagnostic unit 6 can output an error signal 11. The diagnostic unit 6 includes a checking unit 12 that checks the output of the position indication P of the recognized person M for plausibility using a plurality of plausibility criteria C1, . . . , Ci. In addition, the diagnostic unit 6, which includes the checking unit 12, is configured in the event that at least one plausibility criterion C1, . . . , Ci is violated, to recognize an error and to output the error signal 11 at the second output 10.

The diagnostic unit 6 or the checking unit 12 is further configured to receive and evaluate additional information Z1, . . . , Zi and to include the additional information in the plausibility check. A first item of additional information z1 is supplied to the diagnostic unit 6 via a turnstile DK. The turnstile DK determines the number of persons located in the area to be monitored. For example, if two persons are located in the area to be monitored, then the person detector 2a must always report exactly two persons. Using this first additional information z1, the diagnostic unit 6 can then determine errors.

For better decision-making, a decision unit 20 can also be arranged downstream of the monitoring system 1. The decision unit 20 receives the confirmation signal 9 and the error signal 11. If the diagnostic unit 6 has recognized an error, the decision-making unit 20 can decide to first tolerate this error, for example, if a person is missing in exactly one image, but is detected again in the same place in the next image. Otherwise, the downstream decision unit 20 can also signal a dangerous failure of the person detector.

Figure 2:
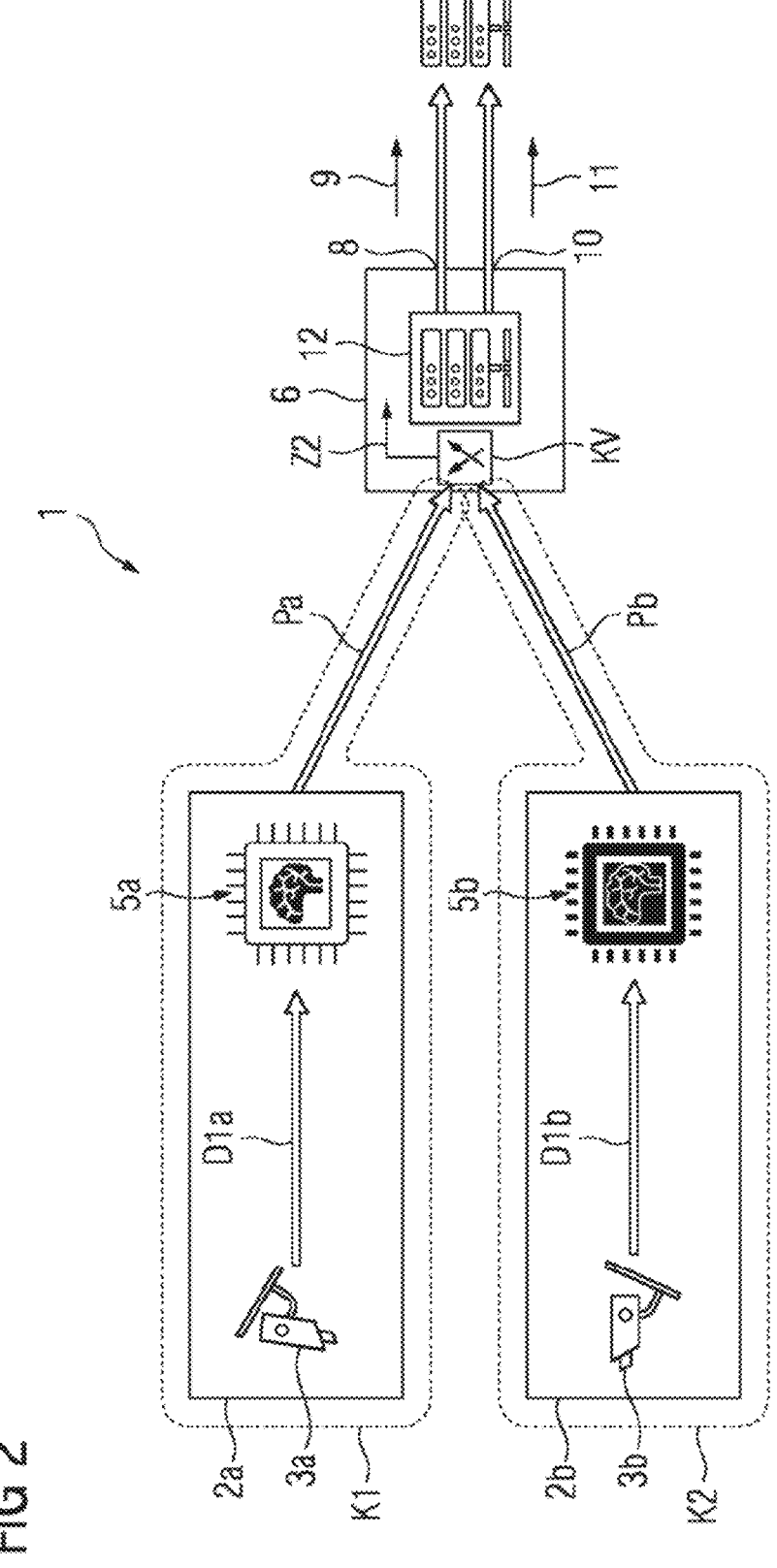
FIG. 2 shows the monitoring system in a two-channel configuration with a cross comparison in accordance with the invention.

FIG. 2 illustrates the possibility of using a second item of additional information 22 via a cross comparison between a first channel K1 from a first person detector 2a and a second channel K2 from a second person detector 2b for the position data P. The first channel K1 and the second channel K2 are established to be diverse with respect to one another. A cross-comparator KV constantly compares the first position data Pa and the second position data Pb and generates the second item of additional information 22 therefrom. Random hardware errors in the individual components E1, E2 could then be uncovered.

Figure 3:
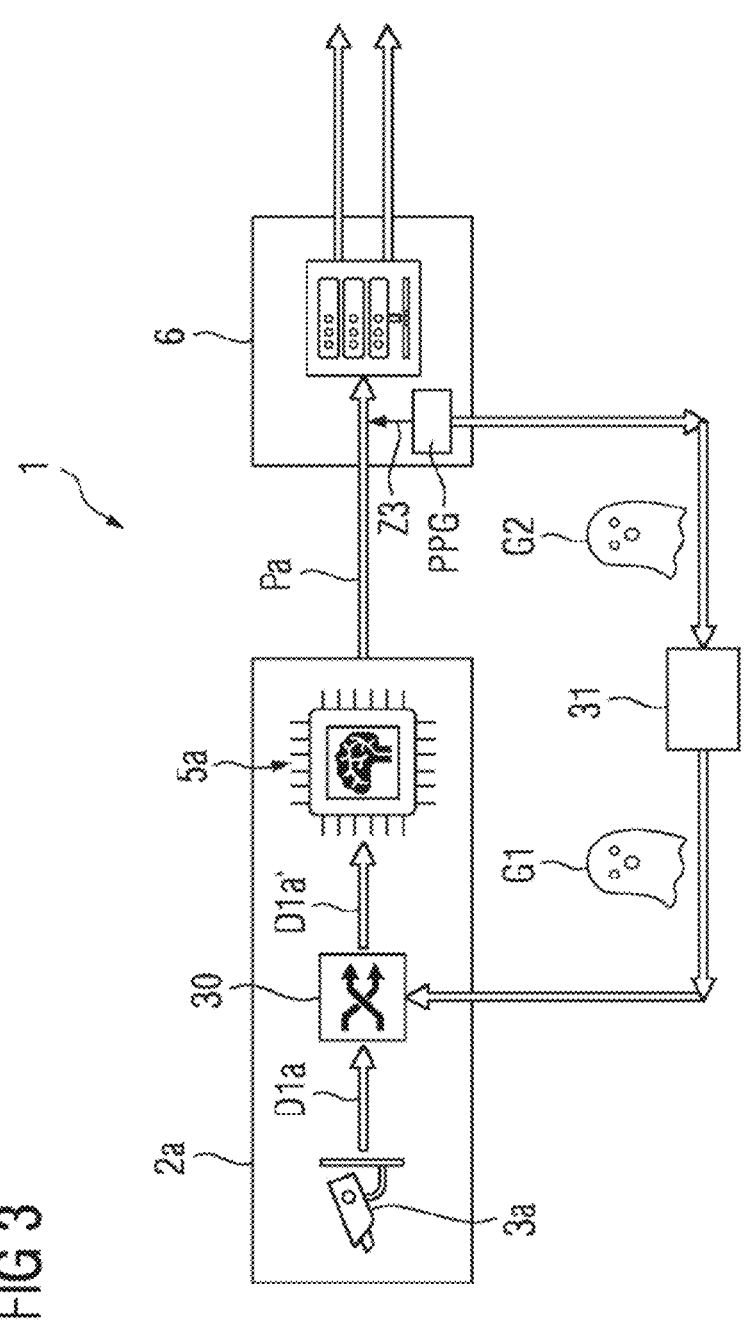
FIG. 3 shows the monitoring system with a possibility of feeding phantom images in accordance with the invention.

FIG. 3 illustrates the possibility of generating a third item of additional information 23 by forming phantom images G1, G2. For this purpose, the person detector 2a has an image mixing unit 30 which is configured to overlay the phantom image G1, G2 into the image files D1a, as a result of which a current camera image is superimposed by the phantom image G1, G2 and a third item of additional information Z3 can thus be evaluated in the diagnostic unit 6. For this purpose, the diagnostic unit 6 has a phantom image generator PBG. The phantom image generator PBG generates, for example, a first phantom image G1 and a second phantom image G2. The phantom images G1, G2 are processed via a reproduction unit 31 such that they can be correspondingly processed in the image mixing unit 30.

Figure 4:
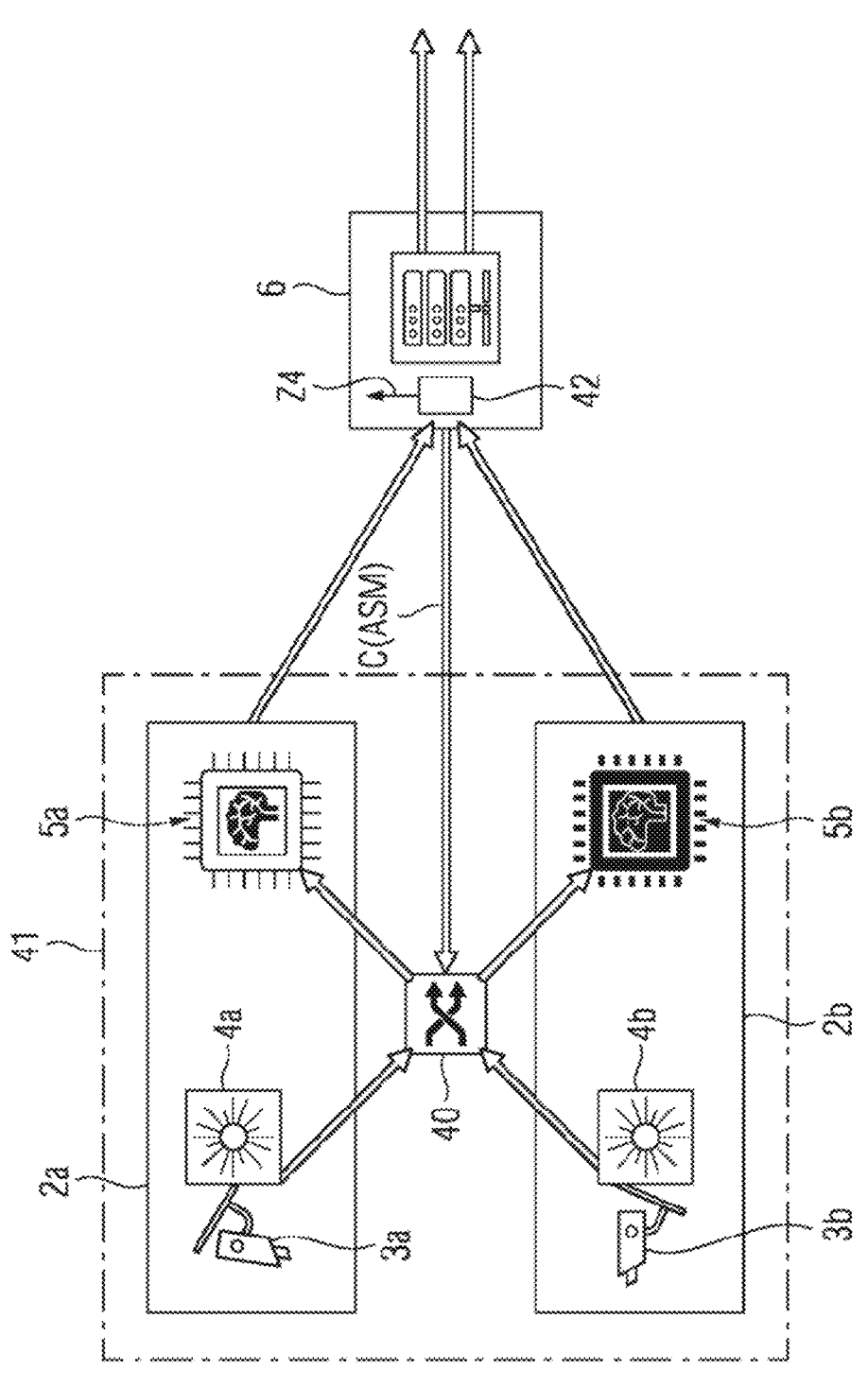
FIG. 4 shows the monitoring system with the use of a round robin method in accordance with the invention.

Another possibility for improving the detection of errors is shown in FIG. 4. The monitoring system 1 of FIG. 2, having a first channel K1 and a second channel K2, now has an assignment unit 40. The assignment unit 40 is configured to receive a control signal C from the diagnostic unit 6 in a combination 41 of the first person detector 2a and the second person detector 2b, where the first person detector 2a includes a first camera 3a for recording digital image files D1a and includes a first evaluation unit 5a. The second person detector 2b includes a second camera 3b and a second evaluation unit 5b. The diagnostic unit 6 is configured to generate the control signal C such that an assignment ASM from the first camera 3a to the first evaluation unit 5a or to the second evaluation unit 5b is performed. The assignment ASM can further include the second camera 3b being assigned to the first evaluation unit 5a. The assignment ASM is thus specified by the control signal C, which is generated in the diagnostic unit 6. The diagnostic unit 6 is configured to use this specification to generate a fourth item of additional information 24 using a change in the assignment ASM with an expectation. The diagnostic unit 6 is configured such that, after each change in the assignment ASM, it can compare an expectation from the recognized position inputs P from the previous assignment ASM with the recognized position inputs P from the currently existing assignment ASM. If the expectations do not match, then the error signal 11 is output.

Figure 5:
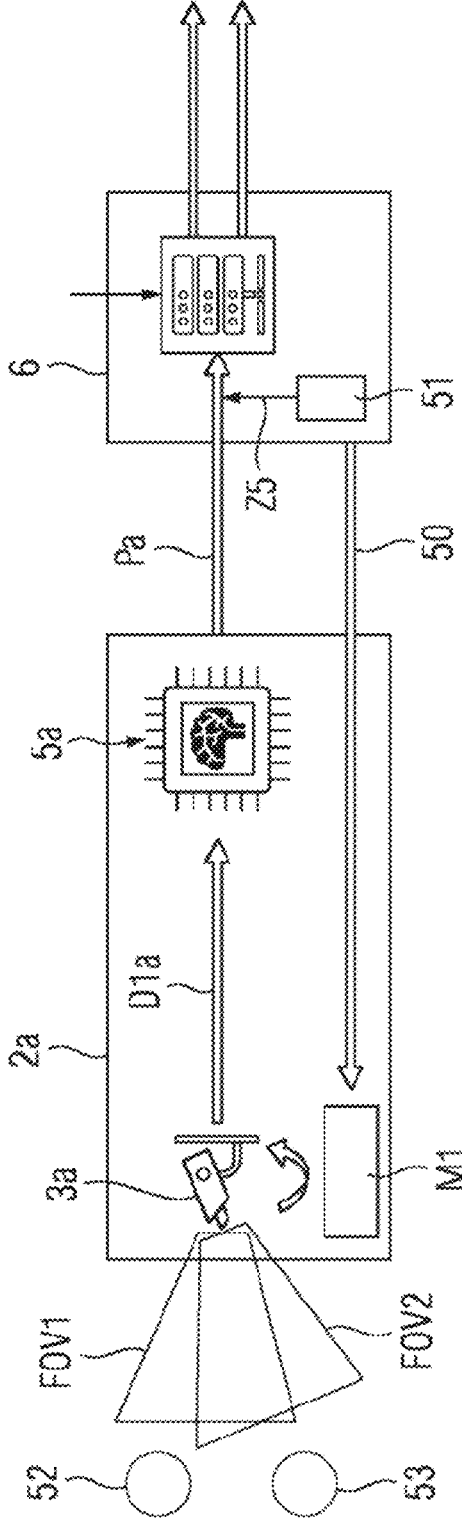
FIG. 5 shows the monitoring system with the possibility of changing a camera setting via a motor in accordance with the invention.

FIG. 5 illustrates a further measure in order to improve the error detection. The monitoring system 1 now has an actuator M1, which is configured to act on the camera 3a such that a camera section 52 or a laser scanning area 53 of the monitored area FOV changes by a predetermined range. For example, a first monitoring area FOV1 and a second monitoring area FOV2 can be spanned. The diagnostic unit 6 is configured to control the actuator M1 via control commands 50 such that the camera section changes by a predetermined range, where this change can be evaluated as a fifth item of additional information z5 in the diagnostic unit 6.

Figure 6:
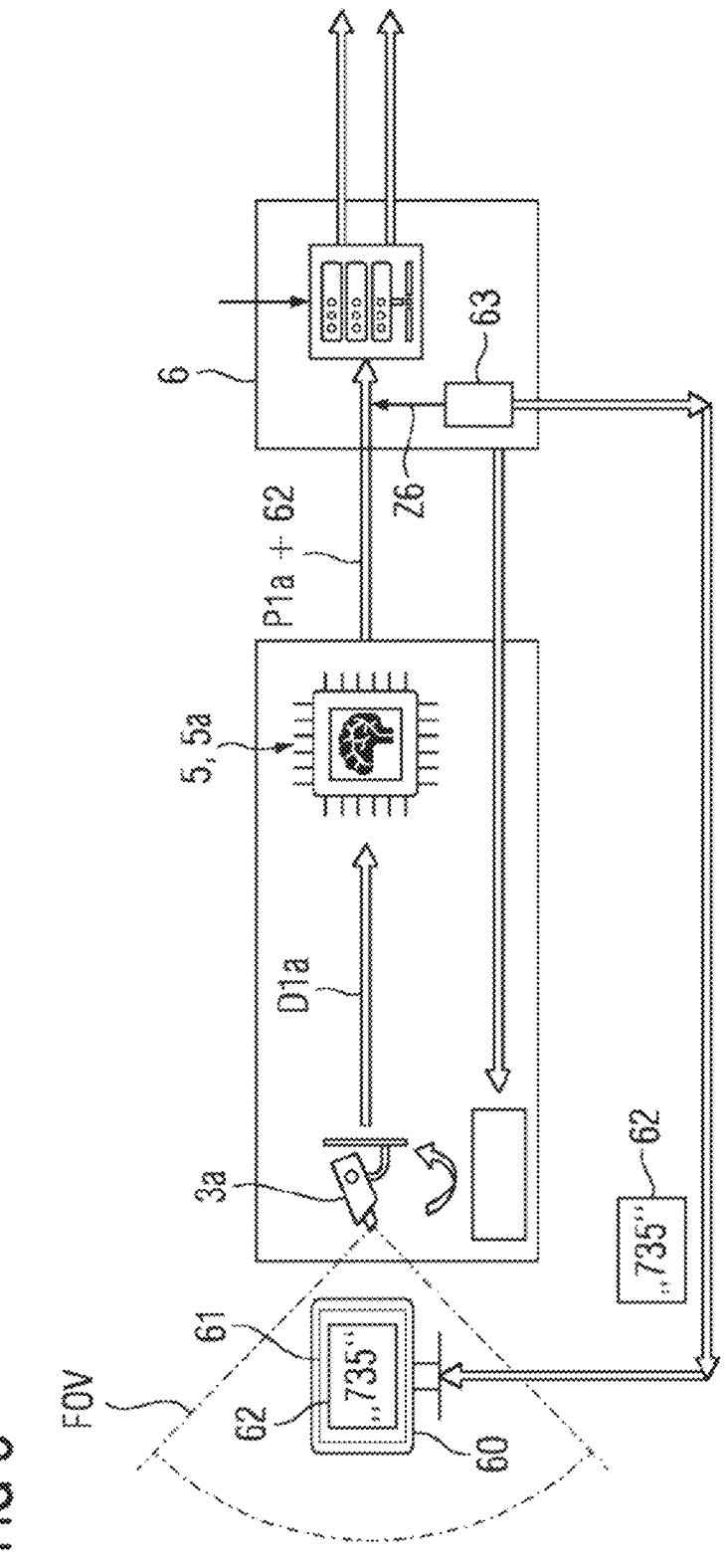
FIG. 6 shows the monitoring system with an additional overlay of a symbol sequence in accordance with the invention.

A further measure is illustrated in FIG. 6. In the monitoring area FOV, a display device 60 is arranged such that the camera 3a detects a notification 61 of the display device 60. The diagnostic unit 60 is further configured to output a symbol sequence 62 as a notification 61 on the display device 60. The evaluation unit 5 is configured to recognize this symbol sequence 62 "735" and so as to communicate this as a sixth item of additional information Z6 to the diagnostic unit 6.

Figure 7:
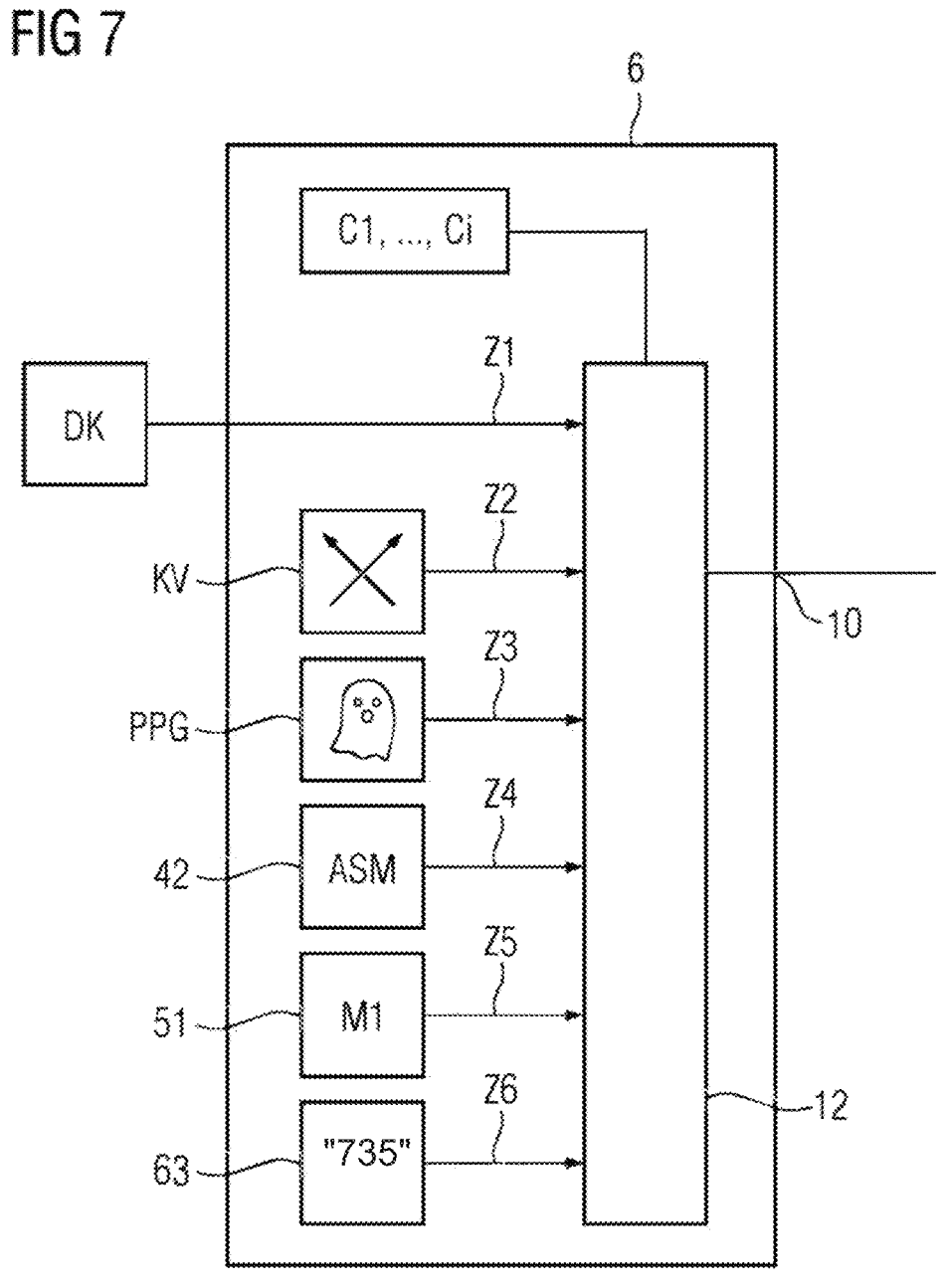
FIG. 7 shows a diagnostic unit with the checking unit and the additional information to be evaluated in accordance with the invention.

In summary, FIG. 7 can show a diagnostic unit 6, which evaluates all plausibility checks C1, . . . , Cn and all additional information Z1, . . . , Z6 by the checking unit 12.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements that perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A monitoring system having a first person detector, the monitoring system comprising:

an imaging sensor for recording digital image files or point clouds;

an evaluation unit, which is designed so as to evaluate the image files or the point clouds and so as to output a position indication of a person that is recognized in a monitored area;

a diagnostic unit having a first input channel and being configured to receive the position indication and a first output for a checked position indication of the recognized person and a second output for an error signal, the diagnostic unit including a checking unit to check the output of the position indication of the recognized person for plausibility utilizing a plurality of plausibility criteria, and the diagnostic unit being further configured in an event that at least one plausibility criterion is violated, to recognize an error and output the error signal at the second output;

wherein the diagnostic unit is further configured to receive and evaluate additional information and to include the additional information in the plausibility check, and the diagnostic unit further including a further person detector, the diagnostic unit being further configured to utilize a cross comparison between a first channel from a first person detector and a second channel from a second person detector as additional information for the position data, the first and second channels being configured in a diverse manner with respect to one another, the monitoring system further comprising:

an assigning unit which configured to receive a control signal from the diagnostic unit in a combination of the first person detector and the second person detector;

wherein the first person detector includes a first imaging sensor for recording digital image files or point clouds and includes a first evaluation unit, wherein the second person detector includes a second imaging sensor for recording digital image files or point clouds and includes a second evaluation unit;

wherein the diagnostic unit is further configured to generate the control signal such that one of (i) an assignment of the first imaging sensor to the first evaluation unit or the second evaluation unit and (ii) an assignment of the second imaging sensor to the first evaluation unit or the second evaluation unit is specified by the control signal, and the diagnostic unit is further configured to utilize said specification to generate a fourth item of additional information after a change in the assignment with an expectation, based on the diagnostic unit being configured such that, after each change in the assignment, an expectation from the recognized position indication from the preceding assignment is compared with the recognized position indication from the currently existing assignment, if the expectation fails to match, the error signal is output.

2. The monitoring system as claimed in claim 1, wherein the diagnostic unit is further configured to evaluate, as first additional information, a number of the persons which are located in the monitored area being monitored.

3. The monitoring system as claimed in claim 1, wherein the diagnostic unit is further configured to generate a phantom image, the person detector including an image mixing unit which is configured to overlay the phantom image into the image files, such that a current camera image is super-imposed by the phantom image and further additional information is evaluated.

4. The monitoring system as claimed in claim 2, wherein the diagnostic unit is further configured to generate a phantom image, the person detector including an image mixing unit which is configured to overlay the phantom image into the image files, such that a current camera image is super-imposed by the phantom image and further additional information is evaluated.

5. The monitoring system as claimed in claim 1, wherein the imaging sensor includes an actuator, and the diagnostic unit is further configured to control the actuator via control commands such a that a section of the monitored area changes by a predetermined range, said changes of the a section of the monitored area being evaluated as a fifth item of additional information in the diagnostic unit.

6. The monitoring system as claimed in claim 2, wherein the imaging sensor includes an actuator, and the diagnostic unit is further configured to control the actuator via control commands such a that a section of the monitored area changes by a predetermined range, said changes of the a section of the monitored area being evaluated as a fifth item of additional information in the diagnostic unit.

7. The monitoring system as claimed in claim 3, wherein the imaging sensor includes an actuator, and the diagnostic unit is further configured to control the actuator via control commands such a that a section of the monitored area changes by a predetermined range, said changes of the a section of the monitored area being evaluated as a fifth item of additional information in the diagnostic unit.

8. The monitoring system as claimed in claim 1, further comprising:

a display device arranged in the monitored area in such that the imaging sensor detects a notification of the display device, wherein the diagnostic unit is furthermore configured to output a symbol sequence as a notification on the display device; and wherein the evaluation unit is further configured to recognize the output symbol sequence and to communicate said recognition as a sixth item of additional information to the diagnostic unit.

9. The monitoring system as claimed in claim 1, wherein the diagnostic unit is comprises an industrial controller which is certified in accordance with International Electro-technical Commission standard 61508 standard and is further configured as a controller which for providing functional safety.

10. The monitoring system as claimed in claim 1, wherein the diagnostic unit is configured to perform the following plausibility checks:

a) recognize persons which appear or disappear in a center of the image;

b) recognize sudden positional changes;

c) recognize speeds of persons, which are greater than 2 m/s;

d) recognize persons in areas with access restrictions; and e) recognize persons in positions which are physically impossible.

* * * * *